Nov. 21, 1939.   R. B. THOMPSON   2,180,566
FISHING REEL
Filed March 9, 1937
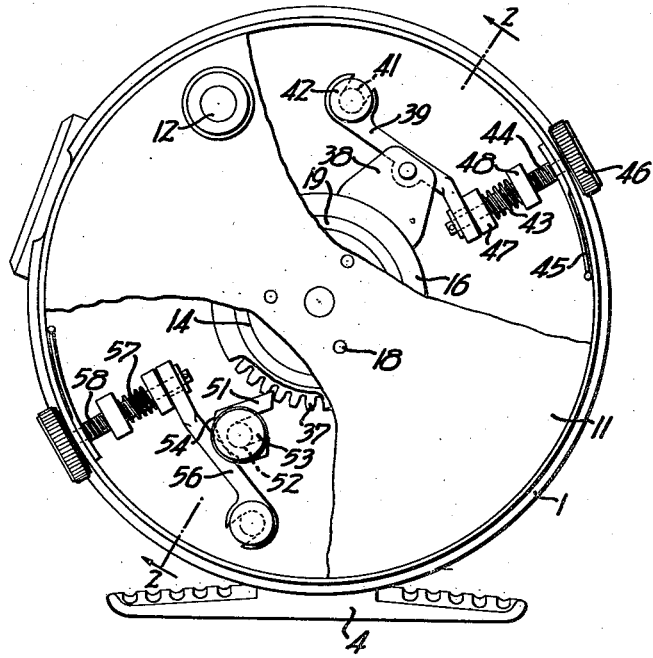
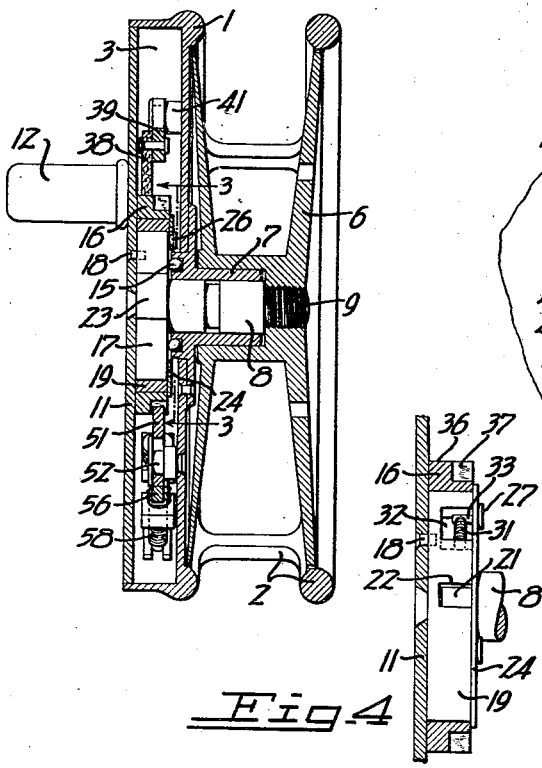
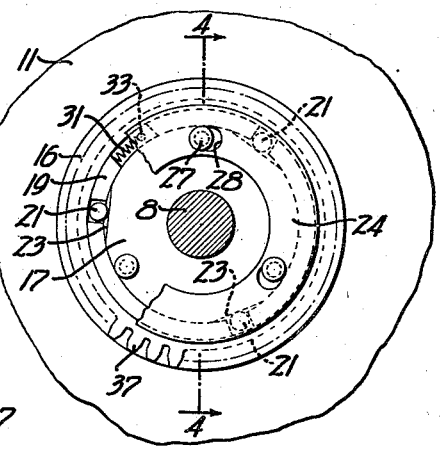
INVENTOR
RICHARD B. THOMPSON
BY Charles S. Evans
HIS ATTORNEY Patented Nov. 21, 1939

2,180,566

UNITED STATES PATENT OFFICE 2,180,566

FISHING REEL

Richard B. Thompson, San Francisco, Calif., assignor, by direct and mesne assignments, to Thompson Reel Co., San Francisco, Calif., a corporation of California Application March 9, 1937, Serial No. 129,851

10 Claims. (Cl. 242—84.6)

My invention relates to a reel for use in fishing, and particularly to a clutch and brake mechanism for controlling the rotation of the drum upon which a line is wound.

It is among the objects of my invention to provide a fishing reel having an overrunning clutch arranged to effect connection of the winding drum with a brake, as a line is paid out from the drum; and to free the drum from restraint by the brake, as the line is drawn in.

Another object is to provide a reel arranged to restrain rotation of the winding drum, in one direction to a desired degree; and to permit unrestrained rotation in the opposite direction.

A further object is to provide a reel wherein the restraint, imposed upon the rotation of a winding drum, may be easily and accurately adjusted and maintained in accordance with the requirements of the service for which it is being used.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawing:

Figure 1 is a side elevational view of a reel embodying my invention, portions being broken away;

Figure 2 is a transverse sectional view, the section being taken upon the line 2—2 of Figure 1, in the direction indicated;

Figure 3 is a fragmental sectional view taken upon the line 3—3 of Figure 2 in the direction indicated, the figure being drawn upon a larger scale; and Figure 4 is a fragmental sectional detail taken upon the line 4—4 of Figure 3 in the direction indicated, the clutch mechanism being shown in elevation.

In terms of broad inclusion, the reel of my invention comprises a winding drum for receiving a fishing line. A brake drum is connected to the winding drum by means of an overrunning clutch, whereby rotation of the winding drum, in one direction, is subject to the restraint imposed by the brake drum, while rotation of the winding drum, in the opposite direction, is permitted to occur independently of the brake drum, and without restraint thereby. Means, such as a click, or a drag, or both, are provided in connection with the brake drum, for restraining rotation thereof; and means are provided for adjusting the degree of restraint so imposed upon the brake drum.

In terms of greater detail, and referring particularly to the preferred embodiment illustrated in the drawing, the reel of my invention comprises a frame 1, provided with a cage 2 upon one side, and an outwardly opening recess 3 upon the opposite side. A reel seat 4 is provided upon the frame 1, whereby the reel may be mounted upon a fishing rod, not shown, in the ordinary manner.

A winding drum 6 is journaled within the cage 2 upon a hollow bearing 7 carried by the frame 1. A shaft 8 is journaled within the hollow bearing 7. One end of the shaft 8 is provided with a threaded extension 9 arranged to be screwed into the hub portion of the drum 6. The opposite end of the shaft 8 is riveted, or otherwise rigidly secured, to a cover plate 11 arranged to cover the open outer end of the recess 3. A suitable handle 12 is mounted upon the plate 11 for rotating the shaft 8 and winding drum 6.

The thread upon the extension 9 is made right or left handed in accordance with whether the reel is intended for use by a right or left handed user, so that, as a line is reeled in, the turning movement of the shaft, and the pull on the line, will cooperate to move the shaft and drum together, and thereby bind the same in assembled relation. The parts may be separated by holding the drum, and unscrewing the shaft 8 therefrom.

An overrunning clutch, designated in general by the numeral 14, is mounted in association with the shaft 8 and a ring or brake drum 16. For this purpose, I prefer a clutch of the roller type illustrated. However, other types of overrunning clutch, such as a pawl and ratchet may be used.

In its preferred embodiment, the clutch 14 comprises a hub 17, which may be formed integrally with the shaft 8, or otherwise secured thereto in any suitable manner. The hub is positioned within the recess 3, immediately in back of the cover plate 11. Preferably the plate 11 is riveted to the hub 17 by rivets 18 to secure greater strength and rigidity. A thrust bearing 15, upon the frame 1, is engaged by the inner face of the hub 17 to prevent the hub 17 from binding against the frame 1, when the shaft 8 is screwed into the drum 6.

A roller cage 19 is fitted over the hub 17. The cage is provided with a plurality of rollers 21 loosely fitted into recesses 22 in one side and the inner face of the cage. The rollers are of a diameter such that they project slightly inwardly from the inner face of the cage. Flattened areas 23 are provided on the periphery of the hub 17 to accommodate the inwardly projecting portions of the rollers 21.

An annular plate 24, mounted on the inner side of the hub 17, extends outwardly past the periphery of the cage 19. The plate 24 is mounted by means of pins 26 screwed to the hub 17, and provided with heads 27. Openings 28, in the plate 24, permit the plate to be moved over the heads 27; and afford a limited amount of movement of the plate 24 relative to the hub. The plate 24 is shifted after it has been moved onto the pins 26 sufficiently to cause portions of the plate to be engaged between the hub 17 and the heads 27. This engagement serves to hold the plate 24 in operative position for movement with the hub 17.

A spring 31 is mounted within a recess 32 formed in the inner edge of the cage 19. One end of the spring 31 seats against the cage. The other end of the spring 31 seats against a pin 33, carried by the plate 24, and extending into the recess 32.

The brake drum or ring 16 is rotatably fitted over the cage 19. Preferably the ring 16 seats against the inner side of the cover plate 11, and is retained upon the cage 19 by the overhanging edge of the plate 24. The periphery of the ring 16 is arranged to be engaged by suitable braking means, as, for example, a click, or a drag, or both.

In the drawing, I have illustrated a brake drum arranged to be engaged by both a click and a drag. For this purpose, the periphery of the ring is provided with a smooth friction surface 36 over a portion of its area, and also with an area provided with teeth 37. The toothed portion may be made as a separate ring riveted, or otherwise secured, to the friction portion; or the two portions may be formed integrally.

The drag comprises a brake shoe 38, mounted upon a lever arm 39, which arm is pivoted upon a pin 41. A head 42 retains the arm 39 on the pin. The shoe 38 is pressed against the friction surface 36 by a spring 43 carried by an adjusting stem 44. The stem 44 extends through an opening in the outer wall of the frame 1, and is provided with a knob 46 upon the outer end. The inner end of the stem engages the free end of the arm 39. The stem 44 may be held in position upon the frame by any suitable means, as for example by a spring clip 45, having a forked end, straddling a reduced section of the stem immediately inside the annular rim portion of the frame.

The spring 43 is mounted over the stem 44 between a cup 47, seating against the end of the arm 39, and a follower 48, threaded on the stem. The follower 48 is provided with a flat face, engaging the frame 1, for holding the follower against rotation. By rotating the knob 46, the follower 48 may be advanced or receded to vary the pressure exerted by the spring 43 against the arm 39, thereby regulating the degree to which the shoe 38 will restrain rotation of the brake drum 16.

The click mechanism is similar to the drag mechanism, except that a pawl 51 is provided in place of the brake shoe 38. The pawl 51 is pivoted upon a pin 52 having a head 53 by which the pawl is retained. The pawl 51 is provided with a cam surface 54 against which a lever arm 56 bears. The arm 56 is similar to the lever arm 39 of the drag mechanism; and is actuated by a spring 57, adjusted by a stem 58 arranged and operated in the same manner as the corresponding parts of the drag mechanism. The pawl 51 engages the teeth 37; and, as each tooth is moved past the pawl, the cam surface 54 displaces the arm 56 against the resistance of the spring 57.

As each tooth 37 is cleared, the pawl 51 snaps back against the next tooth 37, and produces a clicking sound.

When both the drag and the click mechanisms are provided, they are preferably positioned substantially diametrically opposite each other, so that the braking pressure will be applied against opposite sides of the brake drum 16. Either the drag or the click may be omitted if desired.

A line, not shown, is wound onto the reel, and the reel is mounted upon a fishing rod, in the ordinary manner. As line is paid out from the reel, the drum 6 and shaft 8 will be rotated in a counterclockwise direction, as viewed in Figure 1 of the drawing. The hub 17, of course, turns with the shaft 8. As viewed in Figure 3, this movement of the shaft and hub is in the clockwise direction, since the figure shows the side of the hub and brake structure opposite to that shown in Figure 1. Such rotation of the hub 17 causes the flattened areas 23 to wedge the rollers 21 against the inner surface of the brake ring 16, thereby locking the ring and hub for movement together.

When the shaft 8, with its hub 17, is rotated in the opposite direction, as when winding the line onto the drum, the spring 31 is pressed against the cage by the pin 33; thereby advancing the cage with the hub 17, and preventing the rollers 21 from becoming wedged between the hub 17 and the brake ring 16. As a result, the hub 17 and cage 19 are free to turn independently of the brake ring 16, which is held against rotation by the drag and/or click.

The reel, in its preferred embodiment hereinabove described, is primarily useful for fly casting, and similar service. When so used, line is stripped off from the drum by hand, in appropriate lengths for casting, in the ordinary manner. When a fish is caught, the pull exerted by the fish tends to turn the winding drum 6 in a direction for unwinding the line from the reel. This unwinding movement immediately causes the clutch 14 to lock the brake ring 16 to the hub 17; and the rotation of the drum will be resisted by the action of the drag and/or click. Thus, when a large fish is hooked, it can unreel line only against the restraint imposed by the braking means. This drag and/or click is initially adjusted to provide a degree of restraint suitable for the type of fish which it is intended to catch. If need be, adjustment may be easily and quickly made to increase the restraint after the fish is hooked.

When the line is being reeled in, the clutch 14 releases the shaft 8 and hub 17 for rotation independently of the brake ring 16. As a result, the drum is released from the restraint imposed by the drag and/or click; and the user is relieved from the burden of reeling in the line against such restraint.

I claim:

1. A reel comprising a frame, a shaft journaled upon the frame, a winding drum secured to one end of the shaft, a hub upon the opposite end of the shaft, a clutch ring concentric with and seating upon the periphery of the hub, a brake ring concentric with and journaled upon the periphery of the clutch ring, roller means carried by the clutch ring for rotating the brake ring with the hub in one direction and for permitting independent rotation of the hub within the brake ring in the opposite direction, a circumferential friction area and a succession of click teeth circumferentially arranged upon the peripheral edge of the brake ring at opposite ends thereof, a friction shoe engaging the friction area, and a click pawl engaging the click teeth.

2. A reel comprising a frame, a shaft journaled upon the frame, a winding drum secured to one end of the shaft, a hub upon the opposite end of the shaft, a clutch ring concentric with and seating upon the periphery of the hub, a brake ring concentric with and journaled upon the periphery of the clutch ring, roller means carried by the clutch ring for rotating the brake ring with the hub in one direction and for permitting independent rotation of the hub within the brake ring in the opposite direction, a circumferential friction area and a succession of click teeth circumferentially arranged upon the peripheral edge of the brake ring at opposite ends thereof, a friction shoe engaging the friction area, a click pawl engaging the click teeth, the shoe and pawl engaging the brake ring at substantially diametrically opposite points, and independent means for adjusting the pressure imparted by the brake shoe and the click pawl.

3. In a fishing reel, a shaft, a hub fixed to the shaft, a clutch member mounted upon the hub in concentric relation thereto, a brake ring concentric with and journaled upon the clutch member, the clutch member and brake ring nesting over the hub in matching relation thereto, roller means carried by the clutch member for rotating the brake ring with the shaft and hub in one direction and permitting rotation of said shaft and hub independently of the brake ring in the opposite direction, a circumferential friction area upon the periphery of the brake ring at one end thereof, a circumferential toothed area upon the periphery of the brake ring at the opposite end thereof, a brake shoe engaging the friction area, and a click pawl yieldably engaging the toothed area at a point substantially diametrically opposite the brake shoe.

4. In a fishing reel, a shaft, a hub fixed to the shaft, a clutch member mounted upon the hub in concentric relation thereto, a brake ring concentric with and journaled upon the clutch member, the clutch member and brake ring nesting over the hub in matching relation thereto, roller means carried by the clutch member for rotating the brake ring with the shaft and hub in one direction and permitting rotation of said shaft and hub independently of the brake ring in the opposite direction, and means for restraining rotation of the brake ring, said means comprising a rigid arm pivoted at one end at a point spaced from the brake ring, an adjusting screw pivotally and rotatably engaging the arm at its free end, a pivoted member engaged by the arm at a point substantially midway between its ends and held thereby in engagement with the brake ring, a follower upon the adjusting screw, and a coil spring compressed between the follower and the free end of the arm.

5. In a fishing reel, a shaft, a hub fixed to the shaft, a clutch member mounted upon the hub in concentric relation thereto, a brake ring concentric with and journaled upon the clutch member, the clutch member and brake ring nesting over the hub in matching relation thereto, roller means carried by the clutch member for rotating the brake ring with the shaft and hub in one direction and permitting rotation of said shaft and hub independently of the brake ring in the opposite direction, and means for restraining rotation of the brake ring, said means comprising a rigid arm pivoted at one end at a point spaced from the brake ring, an adjusting screw pivotally and rotatably engaging the arm at its free end, a brake shoe pivoted upon the arm at a point substantially midway between its ends and held thereby in engagement with the brake ring, a follower upon the adjusting screw, and a coil spring compressed between the follower and the free end of the arm.

6. A reel comprising a frame having a main web and an annular peripheral flange providing a recess in one side of the frame, a shaft journaled in the frame and extending axially through the recess, an overrunning roller clutch mounted within the recess upon the shaft, a brake ring concentric with and journaled upon the clutch and being driven thereby in one direction only, a rigid arm pivoted at one end upon the main web, an adjusting screw mounted upon and extending through the flange and having its inner end pivotally and rotatably connected to and supported by the free end of the arm, a knob upon the outer end of the screw arranged to seat against the outer peripheral face of the flange, an area of reduced diameter upon the screw adjacent the inner face of the flange, a spring clip seating against the inner face of the flange and having a slot engaging the reduced area of the screw, a follower upon the screw, a coil spring compressed between the follower and the free end of the arm, and means engaged and held by the arm in restraining engagement with the brake ring.

7. A reel comprising a frame having a main web, and an annular peripheral flange providing a recess in one side of the frame, a shaft journaled in the frame and extending axially through the recess, an overrunning roller clutch mounted within the recess upon the shaft, a brake ring concentric with and journaled upon the clutch and being driven thereby in one direction only, a pair of rigid arms pivoted upon the main webs at points spaced from the brake ring, the pivot point of one arm being substantially diametrically opposite to the pivot point of the other, an adjusting screw for each arm, each adjusting screw being mounted upon and extending through the frame flange at a point diametrically opposite the other and engaging the free end of the adjacent arm, spring clips engaging the adjusting screws adjacent the inner face of the flange, brake ring restraining means pivotally engaged by the arms at points intermediate their ends, and spring means regulated by the adjusting screws and engaging the free ends of the arms for pressing the restraining means against the brake ring.

8. In a fishing reel, an overrunning clutch assembly comprising a hub secured to a reel shaft, a roller clutch ring, and a brake ring, the hub, clutch ring and brake ring being assembled in concentric nested relation with the brake ring journaled upon the clutch ring, and the corresponding ends of the nested members being in substantial alinement for enclosure between a main frame web and a cover plate at one end of the reel, the clutch ring being freely movable within the brake ring in one direction and imparting rotation to the brake ring when rotated in the opposite direction, and means engaging the periphery of the brake ring for restraining rotation thereof.

9. In a fishing reel, an overrunning clutch assembly comprising a clutch ring concentric with and nesting over a shaft hub, a brake ring concentric with and journaled upon the clutch ring in nesting relation thereto, rollers carried by the clutch member arranged to interlock the hub and brake ring for rotation together in one direction only and to permit independent rotation of the hub and clutch member within the brake ring in the opposite direction, a retaining plate movably mounted upon one end of the hub and having its edge portions overlying the rollers and the inner edges of the brake ring for retaining the hub and rings in matching nested relation, and means for restraining rotation of the brake ring.

10. In a fishing reel, the combination with an overrunning clutch and a brake ring journaled upon the clutch and actuated thereby for rotation in one direction only, of means for restraining rotation of the brake ring, said means comprising a rigid arm pivoted at one end, an adjusting screw engaging the free end of the arm, brake ring engaging means pivotally engaged by the arm at a point intermediate its ends, a follower upon the screw, and a spring engaged between the follower and the free end of the arm.

RICHARD B. THOMPSON.